(12) United States Patent
Grohman

(10) Patent No.: US 10,506,406 B2
(45) Date of Patent: *Dec. 10, 2019

(54) BUILDING NETWORK HUB WITH OCCUPANCY AWARENESS

(71) Applicant: SQ Mind Inc, Frisco, TX (US)

(72) Inventor: Wojciech Maciej Grohman, Frisco, TX (US)

(73) Assignee: SQ Mind Inc, Frisco, TX (US)

( * ) Notice: Subject to any disclaimer, the term of this patent is extended or adjusted under 35 U.S.C. 154(b) by 82 days.

This patent is subject to a terminal disclaimer.

(21) Appl. No.: 15/899,195

(22) Filed: Feb. 19, 2018

(65) Prior Publication Data

US 2018/0249311 A1 Aug. 30, 2018

Related U.S. Application Data

(63) Continuation of application No. 14/791,490, filed on Jul. 6, 2015, now Pat. No. 9,900,729.

(60) Provisional application No. 62/021,644, filed on Jul. 7, 2014.

(51) Int. Cl.
| | |
|---|---|
| *H04L 29/06* | (2006.01) |
| *H04W 4/80* | (2018.01) |
| *H04W 4/04* | (2009.01) |
| *H04W 4/029* | (2018.01) |
| *H04W 4/33* | (2018.01) |
| *H04L 12/28* | (2006.01) |
| *H04W 4/30* | (2018.01) |

(52) U.S. Cl.
CPC .......... *H04W 4/80* (2018.02); *H04L 12/2838* (2013.01); *H04W 4/029* (2018.02); *H04W 4/043* (2013.01); *H04W 4/30* (2018.02); *H04W 4/33* (2018.02)

(58) Field of Classification Search
CPC .................................................. H04L 12/2838
See application file for complete search history.

(56) References Cited

U.S. PATENT DOCUMENTS

| | | | |
|---|---|---|---|
| 9,900,729 | B2 | 2/2018 | Grohman |
| 2005/0025182 | A1 | 2/2005 | Nazari |
| 2016/0183037 | A1 | 6/2016 | Grohman |

*Primary Examiner* — Adnan M Mirza

(74) *Attorney, Agent, or Firm* — Scott T. Griggs; Griggs Bergen LLP

(57) ABSTRACT

A device for enabling Internet access over a wireless short-range communications network that comprises the means to detect and identify the occupants of the room the device resides in, includes a safety mode to prevent unauthorized device reprogramming and works in conjunction with a smart device application to improve accuracy of its occupancy detection capabilities.

20 Claims, 8 Drawing Sheets

700

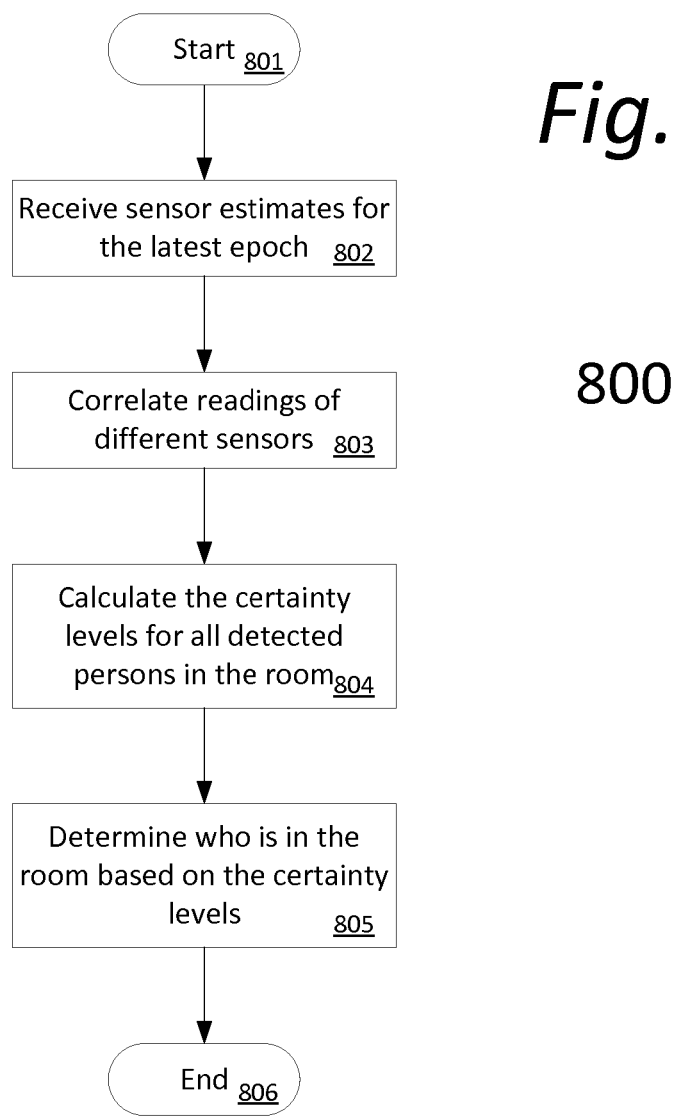

BUILDING NETWORK HUB WITH OCCUPANCY AWARENESS

PRIORITY STATEMENT & CROSS-REFERENCE TO RELATED APPLICATIONS

This application is a continuation of U.S. patent application Ser. No. 14/791,490, entitled "Building Network Hub with Occupancy Awareness", filed on Jul. 6, 2015, in the name of Wojciech Maciej Grohman, now U.S. Pat. No. 9,900,729, issued on Feb. 20, 2018; which claims priority from U.S. Patent Application No. 62/021,644, entitled "Building Network Hub with Occupancy Awareness", filed on Jul. 7, 2014, in the name of Wojciech Maciej Grohman; all of which are hereby incorporated by reference for all purposes.

TECHNICAL FIELD OF THE INVENTION

This application is directed, in general, to systems and methods for facilitating and managing operation of communications-enabled devices inside of a building. It is a part of what is commonly referred to as the Internet of Things (IoT).

BACKGROUND OF THE INVENTION

The recent proliferation of the communication-enabled devices requires a large amount of data being transferred to and from these devices. When located inside of the building these data can be transferred over a communications network of the building. In most current applications, the communications-enabled consumer devices connect to the Internet via a local network, either wired, or wireless.

While the current approach of using one network in a home or small building suffices when there are only a handful of devices communicating with the Internet, such as computers, tablets, thermostats and other large appliances, this solution quickly becomes insufficient and ineffective with the proliferation of number of the devices trying to access the Internet from inside of a building. Large number of devices accessing one local area network (LAN) increases the burden on this network and its router to appropriately divide the network resources among all network nodes. A significant portion of time is spent in switching the communications from one device to another. This is especially prevalent in the wireless networks, where it is usually impossible to have multiple devices sending data at the same time and not interfering with one another.

In addition to this, the cost of adding a device to a local wireless or wired network is significant and can be an economical barrier to its long-term, large-scale, successful deployment. In addition to the component cost, there also is an energy cost associated with broadcasting relatively wideband wireless signals, such as WiFi signals based on a variant of IEEE 802.11 specification. This additional energy cost adds over time to the overall cost of ownership of each device and the entire network.

There is a need for at least a two tiered-solution which allows a trade-off between the total ownership cost of the device and the amount of data it needs to exchange with remote servers on the Internet.

The invention disclosed here aims to provide a solution to this problem by allowing the devices to choose between at least two modes of communication. One network, typically WiFi, is a longer range network used for exchanging large amounts of data or frequent communication. The other network has a considerably reduced range, usually allowing communications within one room only and thus reducing the power needed and preserving battery life for the devices. A typical example of such network is a Personal Area Network or Peer to Peer Network, such as one based on IEEE 802.15.4 family of standards or on any of the variants of the Bluetooth specification, in particular Bluetooth Low Energy.

Another common trend in modern buildings is to make them intelligent so called smart homes or smart buildings are becoming more prevalent and allow users to control various aspects of the building via the local communication network (usually WiFi or IEEE 802.15.4 based). These include programmable thermostats, garage door openers, alarm systems, etc.

These new communication-enabled devices provide the owners the ability to control the respective aspects of the building when operating remotely and as such have proven very useful. They do, however, have a relatively limited capability on their own. Their true power can only be realized when coupled with an intelligent building management system that anticipates the needs of the building occupants and acts to satisfy these needs without the need of special interaction from the user.

Such system relies on sensors to detect presence of people or animals in the building by using various modes of occupancy detection. Most prevalent in use are the occupancy sensors that are very effective at detecting a presence of a person in a room. Their greatest shortcoming is the lack of the ability to identify the person in the room—they cannot usually tell one building occupant from another or whether the person detected should or should not be allowed in the part of the building the sensors are installed in.

It is therefore an aspect of the presented invention to facilitate the detection of the identity of the building or room occupant to enable more intelligent building control.

Another aspect of the presented invention is the combining of the communications hub with the occupancy identity detection to improve the operation of the automated intelligent building control.

Finally, one more aspect of the presented invention combines the communications hub and the occupancy identity detection into one physical device. This serves to greatly reduce cost of deployment of the system for the new intelligent buildings and makes the overall solution much more commercially viable.

SUMMARY OF THE INVENTION

One embodiment includes a communication hub device which is enabled to communicate in two different modes—a short range and a longer range to facilitate an energy efficient Internet access for other devices on the short range communication network via the longer range network.

Another embodiment involves a communication hub device working with the sensor having the ability to detect a person in the room it is installed in.

One more embodiment involves a communication hub device working with the sensor having the ability to identify the occupants of the room it is installed in.

Yet another embodiment combines into one physical device the communication hub device together with the sensors having the ability to identify the occupants of the room it is installed in.

Another embodiment involves a communication hub device which acts in communication with other devices on its network to identify the occupants of the room it is installed in.

Yet another embodiment involves a secure communication hub device with a hardware switch to facilitate secure remote firmware updates.

One more embodiment is a smart device application working with the disclosed network hub to facilitate its installation.

BRIEF DESCRIPTION OF THE DRAWINGS

Reference is now made to the following descriptions taken in conjunction with the accompanying drawings, in which:

FIG. 8 illustrates a flowchart of a method to determine current occupancy in a room with an occupancy-aware network hub.

DETAILED DESCRIPTION OF THE INVENTION

Figure 1:
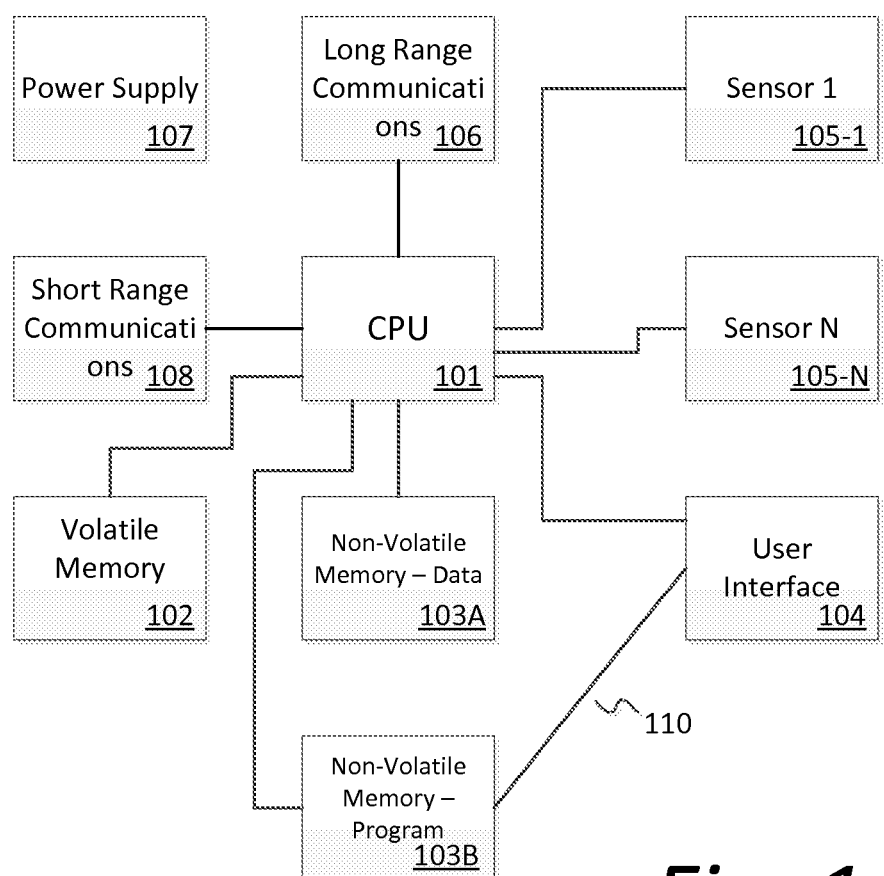
FIG. 1 depicts one illustrative and non-limiting embodiment of a occupancy-aware network hub with its various sub-components.

The FIG. 1 illustrates an example embodiment of a device 100 of the presented disclosure. The device is equipped with a Central Processing Unit 101, working with volatile memory 102 to store in it the temporary data and with non-volatile memory (NVM) 103A to store there the data that needs to be retained after the power reset of the device and multiple device power cycles. Furthermore, the CPU 101 works with the non-volatile memory 103B to store there the program that executes on the CPU. For those skilled in the art, it is apparent that the non-volatile memories 103A and 103B can in fact be the same memory contained within one chip package. For the purposes of some of the novel aspects of the invention, a differentiation is made here to separate the two memories. The one non-volatile memory 103A used for storing data only can be written and read to at any time. In contrast, the non-volatile memory 103B, used for storing the program executed by the CPU, can be connected to the User Interface 104 to facilitate write protection, so that the program (firmware) updating of the device 100 can only happen with the explicit user consent facilitated directly at the device 100 with the help of its User Interface 104. It is also obvious for those skilled in the art that both memories 103A and 103B, as well as 102 can be contained within the same chip package as the CPU 101 in a device commonly referred to as a microcontroller. Conversely, the same principle of operation applies to a CPU that is separate from memories 102, and/or 103A and/or 103B, commonly referred to as a microprocessor.

It should be noted that the CPU 101 can be implemented as a conventional microprocessor or microcontroller, or a Digital Signal Processor (DSP) or a Field Programmable Gate Array (FPGA) or any combination of these. It should not be considered a limitation of the disclosed invention what computing platform it uses, as long as it is embedded onto the device.

The User Interface 104 of the device 100 consists of two components an input component and an output component. The input component could be a simple single button on the device 100, a communications interface to another device that contains such simple button or a sophisticated keypad or touch screen, or anything in between.

The output component of the User Interface 104 of the device 100 can be an audio or visual response indicator, such as a light or set of lights, a beeper/buzzer, a speaker, a display, a communications interface to another device that contains a response indicator, or any combination of all of the above.

The device 100 further comprises of number of N sensors 105-1 through 105-N. These sensors can be of various types, including temperature, humidity, light, and passive infrared type. Audio range microphones, extended frequency range microphones and optical sensors such as visible spectrum cameras or infrared (IR) cameras or three dimensional imaging cameras can also be employed as sensors.

To support the three dimensional imaging of the sensor there can be multiple optical cameras used (e.g. to support stereovision), as well as a structured light 3D sensor, or a time of flight (ToF) 3D sensor, or any combination of these sensors.

Cameras may be coupled with supporting sensors and actuators, a typical example would be a single infrared light source, such as an infrared light emitting diode (LED), or an array of such LEDs. Visible light LEDs and lasers can be used as well.

The next component of the device 100 is the Long Range Communications module 106 typically used as a medium to connect to the Internet. The circuit consists of the electronics needed to receive, modulate, and demodulate the wired or wireless signals. These long-range communication signals can also be encoded, decoded, encrypted and decrypted by either the Long Range Communications module or the CPU 101. The modulation/demodulation, encoding/decoding and encryption/decryption can be performed in hardware or in software or by the most advantageous combination of both running either on the long range communications module or the CPU or the combination of both of these hardware units. The typical long range communications module is a wireless chip supporting any combination of variants (e.g. 802.11a, 802.11ac, 802.11b, 802.11g, 802.11n) of the IEEE 802.11 wireless local area network specifications. These standards usually offer higher robustness and better through-wall communication capabilities than other wireless protocols, especially in the globally available 2.4 GHz spectrum. They can also operate in other frequencies, such as the 5.0 GHz band.

In addition to, or as a replacement of the wireless communications, the long range communications module can include a wired communication component, such as one supporting Universal Serial Bus (USB), Broadband over Power Lines (BPL) through any of the IEEE 1901-based standards, or Ethernet (IEEE 802.3-based) communications.

The device 100 with all its components is powered by the power supply 107. The power supply takes one type of input voltage and translates it into the power supply needed to power all device components. Typically, the input to the power supply 107 is a battery and/or the battery charging system. In some applications the input may be an output of the wall wart, USB charger, or even the AC power delivered straight from the building's AC outlet.

Finally, there also is a Short Range Communications module 108. The module serves to communicate wirelessly to other devices within the vicinity of the device. In typical applications, this means devices located within the same room as the disclosed device itself. The short range communication is usually based on the existing standard wireless communications, such as the ones based on IEEE 802.15.4 standard or on the Bluetooth wireless communications family of standards. Typical standards include Zigbee, 6LoWPAN and Bluetooth Low Energy (BLE).

In addition to, or as a replacement of the wireless communications, the short range communications module can include a wired communication component, such as one supporting RS-232, RS-485, Controller Area Network (CAN), Digitally Accessible Lighting Interface (DALI), Ethernet, Universal Serial Bus (USB), optical fiber or other proprietary or application-specific interface such as Apple's Lightning interface. Such a wired communication link can also be used to power the end device through the communications hub, minimizing wiring effort and improving energy efficiency.

An important function of the disclosed device is ability to facilitate external network access to the client devices on the short range communication network, via the device's long range communications module 106. As such, the device 100 acts as a network hub enabling multiple client devices communicating with it via short range communications to exchange data over the long range communications. Typically, the short range communications enabled client devices exchange data with servers that contain their configuration, collect, process and store their usage and diagnostic information and provide them with firmware updates. In some applications, the servers can influence the behavior of the client device by issuing control commands to it. Such commands are carried over the Internet, over the building's long range communications network, via the Long Range Communications module 106 to the device 100. The device 100 then sends these commands out via its Short Range Communications module 108 to the client device.

This arrangement allows for these client devices to have the best of both worlds—be battery powered and thus portable and/or easy to install, and be able to communicate via the Internet. Typically, this is not possible for devices that operate on wireless local area networks due to the energy footprint needed to communicate on these networks. The typical 802.11 based communication requires a channel bandwidth of over 20 MHz, whereas the 802.15.4 based protocols require a channel bandwidth of only 2 MHz. This translates directly into power usage. The device that has to transmit a signal that is 20 MHz wide is going to expend more energy doing it as the device doing the same (at the same output power density) at 2 MHz wide channel. In practice, this is compensated for by the increased data rates of the IEEE 802.11 based protocols. This allows these devices to send the same amount of data in a shorter time thus having better efficiency per data bit communicated wirelessly. On the receive side, however, these differences cannot be typically easily overcome. This is because a wireless device usually spends more time listening to other wireless devices on its network than the time it spends transmitting out its own data.

Additionally, the IEEE 802.11 based protocols are designed to transport large amounts of data over as large of an area as possible, whereas the low power networks, as the name implies, are designed to optimize the energy usage and trade it off for their effective range. As a result the local area wireless networks are usually allowed a much higher transmit power limits and thus expend more energy when communicating than the low power network devices do.

Many possible energy optimization techniques are typically employed to preserve the energy stored in the client device's battery and thus extend its useful battery life. They do not change the basic principle that short range communications typically use less energy and allow for longer battery life operation.

There are two major components to a wireless communicating client device's power usage—they are the total power needed while communicating and the sleep mode power usage. The amount of energy expended over time translates into battery life of the device—the more energy the device uses over time, the shorter it's battery life.

To make the client devices commercially viable, it is critical to design them in such a way that their battery life is as long as possible, usually many years. The design goal is for these devices to last so long that it is the battery's life expectancy that limits the effective battery life, not the state of its charge over time. Lithium ion and lithium-polymer batteries usually have a life expectancy of 3-5 years and more and therefore it is the design goal for each battery-powered device to make sure that during its anticipated usage, it consumes power from its battery at a pace slower than 20% a year.

Some client devices can be further equipped with large capacity energy storage and an energy harvesting circuitry. This allows extending their battery life to match the product's physical and electric product life, which is often 10 years and more.

The use of the low energy network for local, in-room communications allows devices to limit the amount of energy expended when they communicate with another network node reducing the power usage of the first critical component of the energy efficiency. The use of specific system solutions and low-duty cycle communication protocols allows for the maximum extension of the sleep mode to address the second critical component of a device's total energy efficiency characteristic.

One system solution allowing for energy-efficient low duty cycle communication of client devices on the local in-room communication network is the use of a store-and-forward communication scheme where the communication hub will store and buffer messages coming from either the Internet or the in-room network itself until an addressed in-room network node wakes up and polls the communication hub for new data. To minimize overall Internet-bound network overhead some systems may also use a store-and-forward communication scheme to consolidate messages destined for the Internet that are received by the communication hub within a certain time window. Such an outbound store-and-forward scheme may be limited to a subset of all messages, or may be applied to all outgoing Internet traffic.

Another very important feature of the disclosed invention is the multi-faceted security provided to the building owners and occupants. This includes encryption of the data stored on the device 100 and encryption of its operating software or firmware (in general referred to as program code). The software encryption mechanisms can serve as a very powerful deterrent to hackers trying to take possession of the system. Since the proposed invention includes sensors that can be potentially used to eavesdrop on the building occupants there is a need for the most stringent security measures possible. One such very secure mechanism is provided via the dedicated link 110 from the User Interface 104 to the Non-Volatile Memory—Program 103B.

The dedicated line 110 serves as an additional security feature of the device and prevents reprogramming of the device's program code without direct user intervention. This implies that in addition to software and system security alerting the network administrator about the software/firmware update of the device 100 (and requiring his consent), a physical action is required at the device itself to perform the update. A typical embodiment of such action is pressing a button for a period of time and/or in a predefined pattern, or typing a password on the user interface (if equipped with optional keypad or touchscreen interface). Such action then energizes the temporary hardware circuit that unblocks the activation of the write cycle to the Non-Volatile Memory-Program 103B memory.

Figure 2:
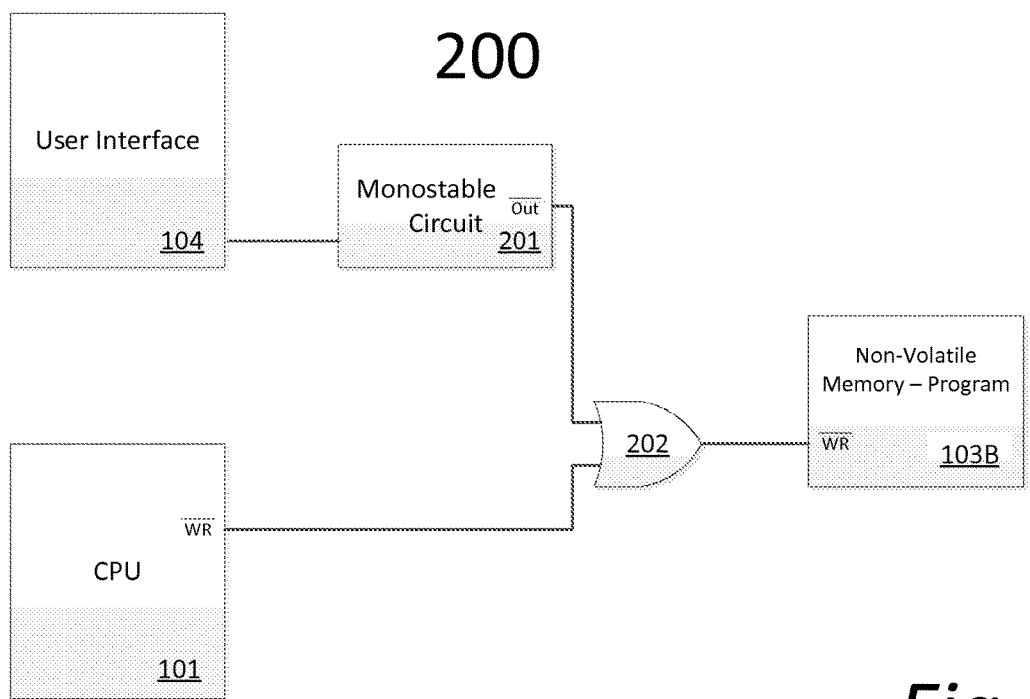
FIG. 2 shows an example model embodiment of the write protection circuit of a network hub.

An example embodiment of such security circuit is presented in FIG. 2. The security circuit 200 is logically located between the User Interface circuit 104, the CPU 101, and the Non-Volatile Memory—Program 103B. In the presented, non-limiting example embodiment, the security circuit is further composed of a monostable circuit 201 with its output active low and the OR logical gate 202. The CPU's output Write signal is also active low. The Non-Volatile memory 103B cannot be written to unless its Write input is driven low by the controlling chipset. Thus, when operating normally, the monostable circuit's 201 output is always in high logical state preventing the output of the gate 202 from ever going low thus not allowing the memory to be written to at a physical chip level. It is only when the User Interface 104 (at least temporarily) actuates the input to the circuit 201 where the output of the monostable circuit is driven low thus allowing the CPU originated control signal to propagate freely to the write input of the Non-volatile Memory—Program circuit 103B, thus allowing it to be written to.

In the presented example the User Interface 104 could be a simple button that is temporarily actuated, say with a single press. Then, the monostable circuit 201 generates a logically negative output pulse with a predefined duration. The duration of the pulse needs to be long enough to allow the CPU to program the memory and short enough not to allow a hacker to take control of the device. If it takes N seconds to reprogram the NVM 103B than it is a good practice to limit the duration $t_{Duration}$ of the pulse to anywhere in between N and 2N ($N<t_{Duration}<2N$), the closer to N the more secure the operation. It is understood by those skilled in the art that the presented example is a simplification of actual implementation of the circuit. In particular, the CPU may be sensing the output of the User Interface 104 and/or the Monostable Circuit 201 to determine when to start the write operation to the NVM 103B. The write signal may be active low as presented or active high, in which case the simple logic of the circuit is modified to include a logical AND gate in place of the OR gate 202 and the output of the Monostable Circuit 201 is active high. Similarly, there is no limitation on the type and number of signals buffered. A more complicated logic could be employed to achieve the same result of temporarily enabling memory writes with help of local user actuation. The logic could employ the use of other control signals such as Chip Enable, Output Enable, Write Enable, Write Protect, etc. The device may be further equipped with multiple NVMs and an equivalent scheme may be used on any combination of them including all of them.

The hardware protection approach is just a part of the enhanced security of the presented device and the system. There are other important parts of the overall design approach that further validate the users and network administrator of the device and the overall building control system and prevent unauthorized access.

Figure 3:
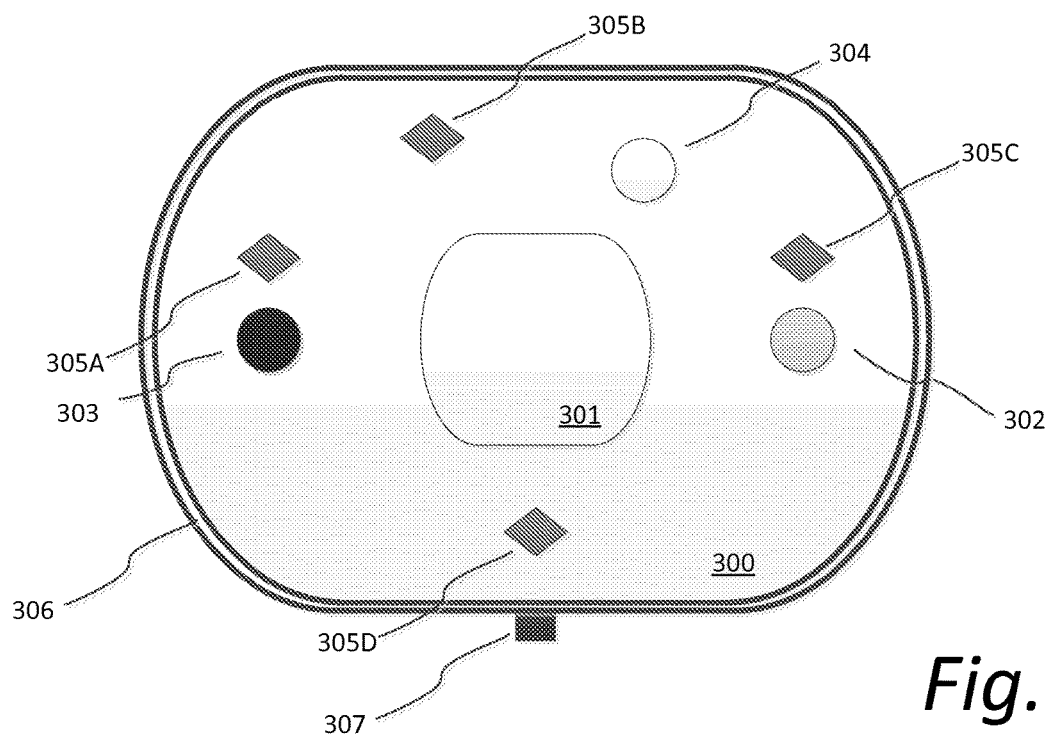
FIG. 3 presents an example of a front view of the presented network's hub.

The example embodiment of the front plate of the disclosed device is shown in FIG. 3. The front plate 300 of the device 100 is what is exposed to the building occupants. The simple user interface button 301 is preferably located near the center of the device and allows physical pressing of it by the building occupant. However, the physical shape or location of the button is not to be considered a limitation of the invention. The device is further equipped with sensors 302, 303, 304 and 305 as well as the light ring 306 and the power interface 307, all mounted on or near the front of the device 100.

The sensors 302 and 303 are imaging sensors defined as array sensors returning a two or three-dimensional representation of the image seen by the sensors. Thus their assembly normally includes the lens, the sensor itself and optionally the light sources to illuminate the scene. In case of a camera imaging sensor the light source could be an infrared or visible spectrum LED allowing the camera sensor to take pictures at night or in low ambient light conditions. In case of a 3D imaging sensor, such as the Time of Flight sensor or the Structured Light sensor the infrared LEDs or projection lasers can be used. In general, any imaging sensor with its supporting circuitry can be used. The active illumination LEDs and or lasers maybe mounted close to the sensor 302 and 303 or anywhere else on the device 100, preferably close to the front plate 300.

In the preferred embodiment the sensors 302 and 303 include at least one two dimensional camera sensor. The other sensor could be a 3-D sensor or another two dimensional camera including another CMOS (or CCD, or any other technology) imaging camera or an IR camera. These two sensors operate to generate an image of the scene in the room the device is located in. While it is preferred that both sensors 302 and 303 are used, it is not necessary and other considerations, such as the cost of manufacturing of the device may outweigh the benefits of employing both. At the very least, one of these sensors is used, but even its use can be optionally disabled.

Since 302 and 303 are imaging sensors, it may be undesirable by the building occupants to have them enabled in certain rooms of the building, for example in bathrooms or bedrooms. Therefore it is another feature of the presented invention that these sensors can be configured to be disabled when the disclosed device 100 is placed in a room requiring occupant's privacy. The disabling of these two sensors can be accomplished in software or in hardware. In case of the hardware solution, the device user interface 104 is equipped with a physical selector switch that allows the sensors to be disabled. The selector switch could indicate the type of room the device is located in (such as bathroom or bedroom, or a living room, or a conference room) or simply switch between different levels of privacy mode from the lowest to the highest. The preferred location for such a physical switch is on the (wall facing) back or side of the device.

The device 100 may be further equipped with a motion sensor 304. This is typically a Passive Infra-Red (PIR) sensor and preferably at least a dual mode PIR sensor allowing not only the detection of motion in the room, but also the direction of the person's movement from right to left of the device or the other way. This sensor is typically always enabled and coupled to the interrupt circuit of the CPU 101 allowing the device 100 to spend most of its time in low-power mode and only waking up its imaging sensors when the motion is detected by the sensor 304.

The device 100 is further equipped with audio and/or extended range microphones 305A, 305B, 305C and 305D. While it is not necessary to have all four sensors, the use of multiple microphones allows for an approximate geospatial identification of the origin of the sound detected by the microphones through signal phase difference measurement and other types of signal processing and can help aid the recognition of a person or an animal in the room. As such it is preferred that the sensors are positioned in specific locations with respect to each other to help facilitate exact sound source location. Four is the preferred, but not the maximum amount of microphones that can be used. A larger number of sensors, often with varying gain settings or frequency characteristics can be used. The number of actual sensors is a compromise between the quality of the recognition of individual sound sources and the device, hence total system cost.

The microphones can also be used to detect relative location of different devices 100 in the same building and help the system build a geospatial model of each room and the whole building. The use of the microphones can be limited or disabled at higher privacy settings of the device.

The light ring 306 is one preferred way to indicate device actions to the local building occupant. As such, the ring is equipped with multiple multi-color light sources, preferably LEDs that allow the device to convey different messages by turning on different lighting patterns that can vary in color as well as in timing. The lighting ring is only one example of such light indicator and other shapes and forms of multi-light source can be used. For example, the light indicator can be of shape of a circle, line, rectangular or a three-dimensional shape as required by the esthetics of the design of the device.

Finally, a power interface 307 allows the device to be powered from an external source such as a PC, a household appliance, wall wart type AC adapter, or any other external power source. The power source can be coupled in via a wired connection such as USB, Lighting connector, Ethernet, etc. or it can be coupled in wirelessly.

The device 100 may further be equipped with a temperature and humidity sensors to allow it detect the type of the room it is installed in, based on temperature and humidity levels detected by other sensors 100 in other rooms of the building. The data collected by these sensors can be used to detect occupancy as well as to improve efficiency of heating and cooling of the room and for any other purpose.

Figure 4:
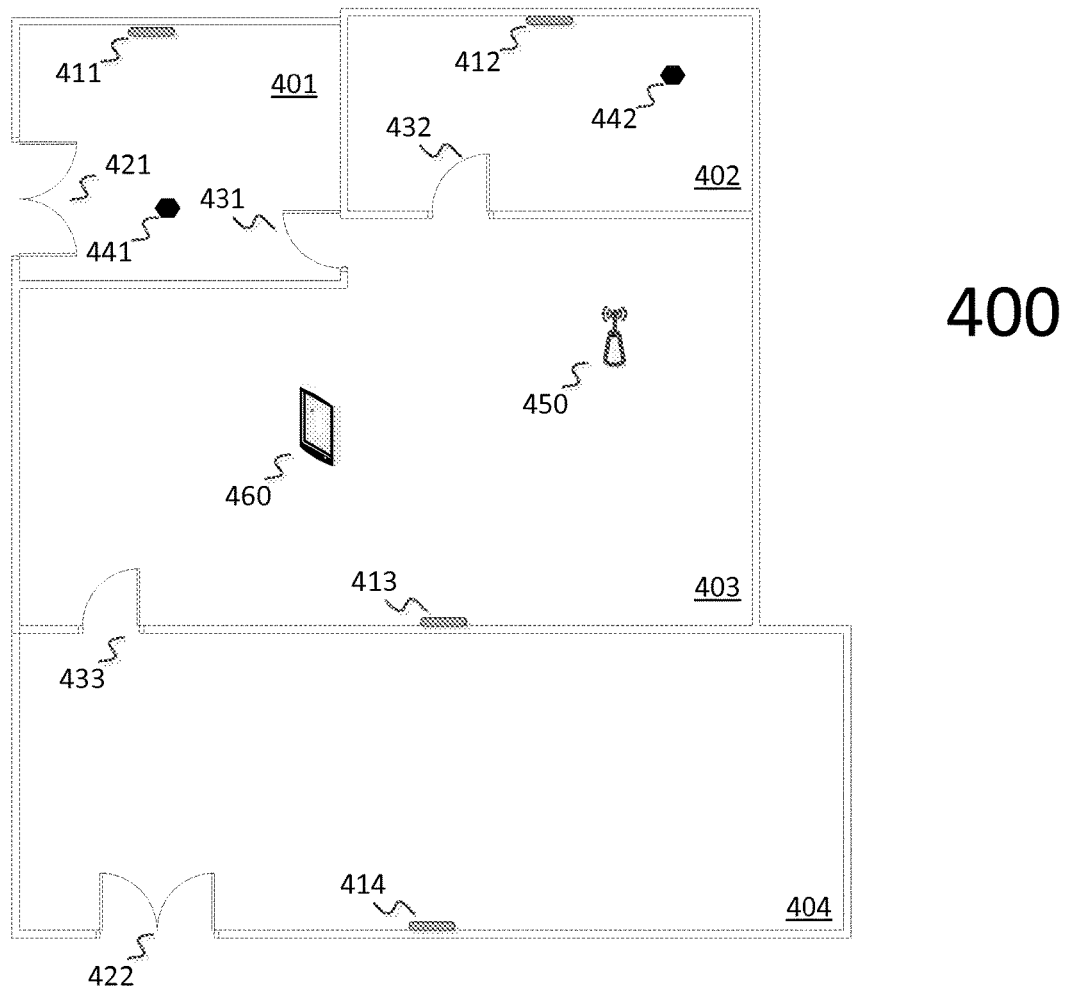
FIG. 4 illustrates an example building with an example implementation of the proposed occupancy tracking network.

FIG. 4 shows an example implementation of the network of disclosed hubs. The building 400 consists of four rooms 401, 402, 403 and 404. There are four occupancy sensing hubs in the building—one in each room—the hubs 411, 412, 413 and 414 are located in rooms 401, 402, 403 and 404, respectively.

While it is preferred that the hubs 411 through 414 include the occupancy tracking sensors in the same physical device, it is not a requirement. It should be understood that when referred to, the occupancy sensing hubs 411 through 414 may be single devices comprising both network communications hub functionality with the occupancy detection and identification capabilities. In some applications, it may be advantageous to separate these two functionalities into two separate physical devices one device being the network communications hub and the other being the occupancy tracking sensor that is communicating with its respective communications network hub over the short or long range communications network. For the purposes of this application when referred to as the occupancy sensing hubs, the hubs 411, 412, 413 and 414 can each be one single physical device, or they can each be a combination of two physical devices separating the network communications hub functionality from the occupancy sensing and identification functionality.

The building has two external doors 421—in the room 401 and 422 in room 404. There are three internal doors in the building—door 431 leads from room 401 to the room 403, the door 432 leads from room 402 to room 403, and door 433 leads from room 403 to room 404.

Hubs 411 through 414 form a network of hubs and connect to the local area network via an access point 450. While the presented embodiment shows the local area network to be wireless, there is no restriction on what medium is used. Any combination of wired and wireless networks can be used with the main goal of the network being allowing the devices on that network access to the Internet and possibly each other. The preferred embodiment for the local area network is a network based on the IEEE 802.11 specification, commonly referred to as the WiFi network.

The network hubs work with an application running on the occupancy network controller 460. Together, network hubs 411 through 414 and the occupancy network controller 460 form the occupancy tracking network. The occupancy network controller could be a standalone device or it can be a software device incorporated into one of the hubs. It can also be a dedicated home automation controller, such as a Crestron Control System, AMX Net Linx controller, Siemens building controller or the like. It can also be an application running on a dedicated local or remote computer. An example of such application is one running on a local tablet computer that utilizes Apple's HomeKit framework to control appliances around the building. In general, the occupancy network controller 460 is responsible to translate the occupancy data into meaningful actions that can be real-time (such as turning on the lights or a light profile as the recognized person enters the room) or log-based—allowing the logging of the event of detecting a specific person entering the room or the building.

It is important to note that the network controller 460 is implemented as software or firmware on a physical device, but does not have to be tied to exactly one piece of hardware. It can be incorporated into other hardware, such as any or all of the occupancy-aware network hubs 411 through 414, any other piece of hardware present within the building or remote from it. What defines the network controller 460 is only what function it performs, whether standalone or part of or in addition to any other functionality it may perform.

One example embodiment is for the occupancy network controller 460 to track the attendance of various employees in a commercial building. The employees are not required to sign/log in when they enter the building and sign out when the leave the system logs their coming in and leaving activity automatically. This allows for greater accuracy of time keeping by eliminating human error. In this embodiment, the occupancy tracking network controller communicates with the server running the attendance tracking application, such as AttendanceOnDemand, TimeForce, etc. to record the times of entry and exit of each tracked employee.

The system works by identifying the person who enters the building, say through the door 422. The hub 414 can detect the identity of the person by means of sound or image recognition as well as by picking up the wireless signals emitted from the device the person carries. If the person carries a smart device, such as a smart phone or tablet, a connected (wrist) watch, a bracelet or any other wearable device including medical devices, the person can be then identified by the hub's 414 wireless receivers. These receivers measure the Relative Signal Strength Indicator (RSSI) of all detected wireless transmitters and match the radio frequency signatures of these signals to the known database of smart devices. The data used to identify the device includes the device MAC address and may include its serial and part numbers and any other data that useful in identifying the device. The database of smart devices may further contain the identity of a person that owns the smart device, so the inference is made by the occupancy sensing hub 414 that there is a high probability that the person who entered the room 404 is the owner of the device whose RSSI indicates close proximity to the hub 414.

The mentioned database may be located in the occupancy network controller 460, on a local or remote server, or in the hub device 411 itself. It is a feature of the disclosed system that the association of the person with the smart device may be learned from the previous encounters with the person by any other hub in the system and stored in the database. In other words, all hubs may learn association of people with their smart device wireless signatures based on the positive feedback from the network administrator. The feedback provided by the network administrator to the network of hubs, or each hub separately may be in form of a picture, or a set of pictures, and voice samples of each known building occupant. If such pictures and voice samples are not available, the system may prompt the network administrator to identify a person not yet known to the system.

The reference pictures may be obtained by the system itself, from one of the system's cameras, or from any other source. An internal database of pictures of the building occupants may be used, or the pictures can be imported from various social networking sites such as Facebook, Google+, LinkedIn, etc.

Each hub identifies each detected room occupant based on the feedback from multiple sensors, including the imaging sensors, the microphones, the wireless signatures and RSSI measurements, etc. Each one of these sensors generates a confidence coefficient—a number representing probability that a detected person is a known person in the database. An additional confidence measure comes from sensors from other rooms. For example, if the building occupant leaves the room 404 through the door 433 and moves on to the room 403, the occupancy detector hub 413 may consider the input (in form of the confidence measure) from the hub 414 identifying the person leaving the room 404 and entering the room 403. In absence of high confidence level of its own measurements, the occupancy sensor 413 may use the confidence levels received from sensor 414 and all other sensors in the building to determine the identity of a person in room 403. This is achieved by exchanging the confidence coefficients of detected persons between different occupancy detector hubs together with attributes describing the person. The attributes may include the representation of the current clothing of the person, such as what type and color of clothing he or she is currently wearing, any head coverings, presence of glasses, shoes, whether the person is carrying something or somebody, etc. These additional attributes are then used by the other occupancy detectors to further increase their own detection confidence coefficients.

In another embodiment, it is the application running on the occupancy network controller 460 that determines identity of a person in room 403 based on the input and confidence measures from other sensors in the house. It is of secondary importance where the identity detection algorithm resides on the network, as long as it has the access to data from multiple occupancy sensors, such as 413 and 414.

An important aspect of the presented invention is ability to track animal or specific people movements within the building. In case of tracking an animal or any other known person the occupancy network may work with an associated alarm system and disable the alarm based on the presence of the known animal or other person in a room. Instead of the alarm going off on detection of any movement, it goes off only on detection of unknown person's movement. The movement of the animals and all persons in general from room to room is tracked by the occupancy network with the described algorithm exchanging information about people or animals moving from one room to another.

Another particular embodiment of the presented invention is tracking that the known person is still confined to be within a room or a number of rooms (or even outside of the building in a fenced off, or otherwise restricted area). In such case when the person is not detected with a predefined confidence level for a predefined length of time, the system may prompt the person to approach one of the occupancy sensors to determine that the person is still present in the room he or she was last detected in or could be in, or it may trigger a set of other, application level actions, such as alarming the network administrator or system supervisor that the person may not be there or may not be moving or reacting to system prompts.

The occupancy-aware network hub's 411 through 414 perform their hub functions by allowing the client devices 441 and 442 the access to the building's LAN and through it, the Internet. There are no restrictions on what constitutes a client device it can be a device that is fixed at one location, confined to a room of the building, or moveable all around the building and outside of it. Client devices are typically equipped with short-range communications only and are normally restricted on the amount of power they can expend to communicate, often they are battery-powered.

For the devices that are fixed to a room or collection of rooms of the building an important feature of the invention is to allow them to be quickly assigned to the specific room. This can be accomplished with the help of bar-code label, Near Field Communications (NFC) tag, or the like affixed to the client device. The bar-code could be any type of a linear or two dimensional matrix code.

The method to assign such a device to the room is to use a smart-device application that allows for the scanning of the label or the NFC tag (by means of either taking a picture of the bar-code or tapping the NFC tag, respectively). The application may then proceed to assign the device to a room as defined by the system during installation by communicating with the occupancy-aware network hub or the network controller 460, or it can be done automatically when the occupancy network knows which room the smart-device is in while taking the scan of the client device.

A similar smart-device application can be utilized in installation of the network of occupancy-aware network hubs. In particular a smart device equipped with a 3-D scanner, such as Google's Project Tango device, Amazon Fire phone, etc. can be used to scan the rooms of the building and upload the 3-D maps of the rooms to the occupancy network hubs or the network controller 460. The upload can happen during the scanning—using the "live upload" method, or after the room or rooms have been scanned—using the "delayed upload" method. In the case of the live upload the occupancy sensor can get the data streamed to it directly from the 3-D scanning smart device via the short-range or the long-range communications network. The assignment of the 3-D map to each room may be done via a selection in the smart-device application or automatically, when the location of the 3-D scanning smart-device is detected by the occupancy sensor network.

In case of using the delayed upload method the data collected from each room can be uploaded to the network hub over a short-range or long-range communications network either directly from the image collecting device, or through the occupancy network controller 460. In such a case, the application running on the occupancy network controller 460 allows for the upload of the data to it and identification of which room of the building the data belongs to.

An important aspect of the disclosed invention is the combination of security and ease of use of the occupancy sensor network. To simplify, yet keep secure, the installation of a client device 441 on the network in the building 400, the system utilizes a multi-step approach. First, optionally, the system has to detect the presence of an authorized person (e.g. system supervisor) in the room 401. Then, when the new device 441 is powered up it starts broadcasting its messages over the wireless short or long-range (wireless or wired) communication network. The hub 411 receives the message from the client device. This message contains data about the client device 441 that uniquely identifies it. This may be a simple text string with the device name and serial number or any other suitable identification data. The hub then checks if the device 441 is already known and allowed on the network. If no such record is found, the hub 411 contacts the occupancy network controller 460 to determine if this client device is already allowed on the network or not. If the occupancy network controller 460 determines that the client device is new to the network, it then sends a message to the system supervisor requesting the confirmation of the new device's identity. Such message contains data retrieved from the device uniquely identifying it. To send the message to the system supervisor, a number of platforms may be used, such as email, SMS message, voice call or any other messaging platform.

Messaging platform used may be any dedicated message exchange platform such as email, Skype, WhatsApp, iMessage, Twitter, SnapChat, etc. In the preferred embodiment a real-time messaging platform is used, but use of other messaging platforms is also possible.

System supervisor is any user of the network with a minimum set of configuration privileges, such as allowing new devices to be allowed on the network. The system supervisor is usually limited to managing devices on the network once the network has been installed and initialized. A network administrator has access to all configuration and data of the network and it he is able to install, uninstall, initialize, upgrade software, add network functionality and perform any task associated with the running, maintaining and operating the network. System supervisor is a network user with more limited set of privileges than a network administrator. Any network administrator is also a system supervisor, but not every system supervisor is a network administrator. In a residential building an example of the network administrator may be the head of household and the system supervisors may be any other adult living in the household. In a commercial environment the system supervisor may be a team or building manager and the network administrator may be the Information Technology (IT) administrator or Director of IT.

Figure 5:
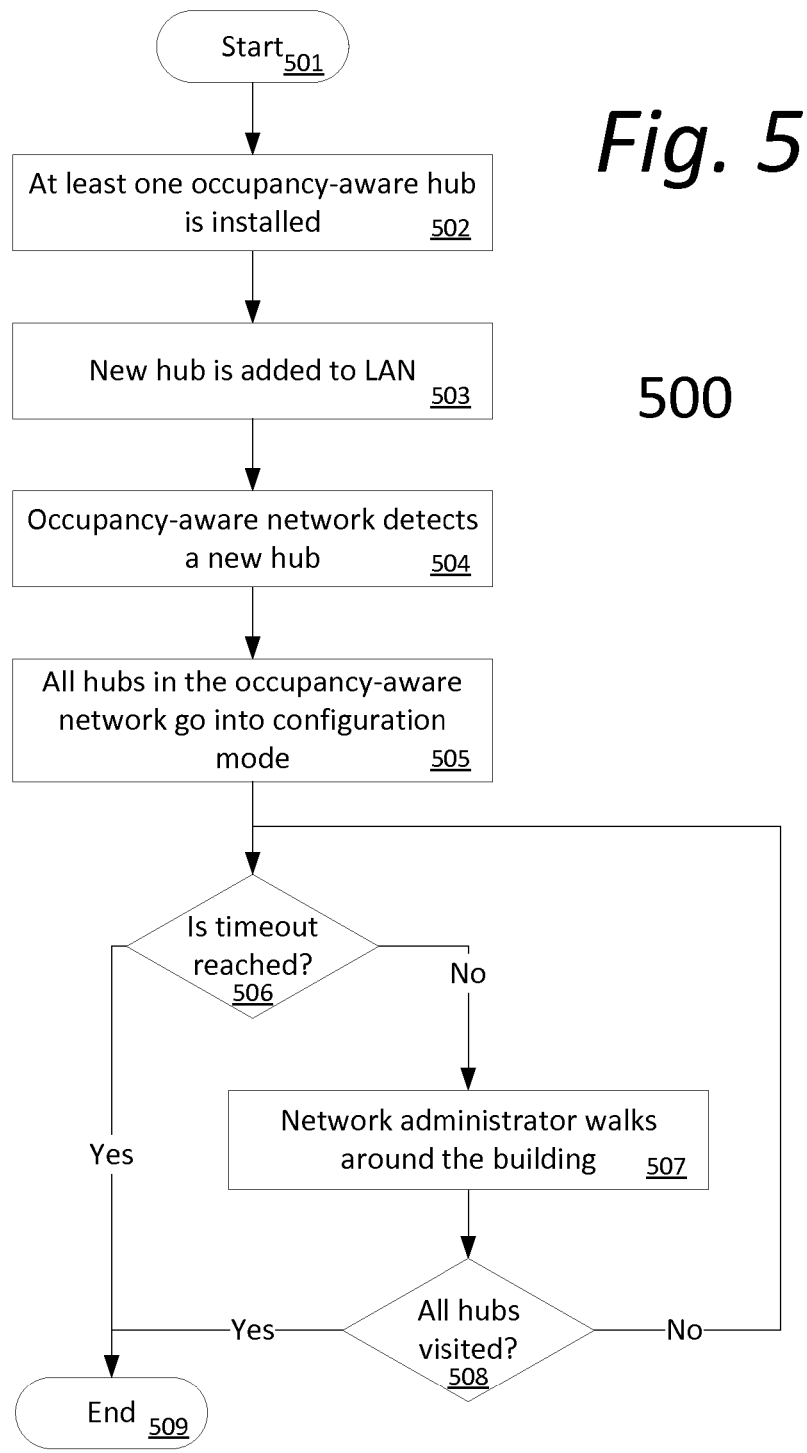
FIG. 5 shows a flowchart of a method to install the network of occupancy-aware hubs.

The ease of installation of the disclosed occupancy-aware sensor network is a critical aspect of the presented invention. The method 500 of installation of the network of occupancy-aware network hubs is shown in FIG. 5. The method starts in locus 501 and proceeds to step 502 where the at least one new occupancy-aware network hub is physically installed. The hubs need to be mounted or placed in locations where their sensors have a good direct view of the room they are installed in. In embodiments where they are powered with an external power source, they need to be mounted in a location that allows connecting to this power source. The sensor are then powered up and added to the local area network in step 503. If the hub is connected to the LAN via a wired connection, usually just plugging it into the network suffices. If the LAN is wireless, the hub needs to be associated with or added to the network.

There are many different methods to add the hub to the wireless LAN. If the wireless network hub is equipped with the WiFi Protected Setup (WPS), any of its methods can be used. Another way to add the hub to the wireless LAN is to first pair it up via Bluetooth to a smart device running an installation application and then using the installation application to enter the network's password into the hub's configuration thus allowing it to communicate on the wireless LAN. There are other methods possible and it should be understood by those skilled in the art that the choice of a method is not a limitation of the presented invention.

Once the hub is connected to the network it starts to listen to messages from other hubs and broadcasting its own messages while measuring the RSSI of signals from other hubs. It uses the measured RSSI and the RSSI of its own signal measured by other hubs on the network to locate itself and identify hubs in close proximity. When a new hub is detected on the network in method step 504, all other hubs may enter a configuration mode in step 505 and remain in that mode until all are taken out of the configuration mode by the network administrator or a timeout is reached in step 506. When the timeout is reached and not all hubs have been configured, the network may operate only with the hubs that have been properly configured.

In the next step 507, once the hubs have been admitted to the wireless LAN and are in the configuration mode, the network administrator may walk through the building approaching all hubs, one at a time and optionally pressing the button 301 on each hub. The hubs learn from the sequence of the appearance of the network administrator (and/or from his optional button presses) the topology of the building and which hubs are in close proximity to one another. This data, combined with data measured through the wireless signal reception measurements is used by the hubs and/or the occupancy network controller 460 to infer the topology of the building.

Once the network administrator has visited each hub at least once within the allowed time in step 508, the configuration mode is successfully concluded in step 509. If the timeout is reached, the method results in correct configuration of only those hubs that have been visited (and optionally whose buttons 301 were touched) administrator.

To facilitate the detection and identification of the room occupants, the device makes use of all of its sensors. The PIR and infrared sensors or sensor arrays can only be used to detect individuals moving around in the room, but the other sensors can be used to both detect and identify the presence of people or animals in the room.

Persons and pets can be recognized based on their image as retrieved by the imaging sensors 302 and/or 303, mostly the visible light cameras, and by the sounds they make as recorded by the microphones 305A-D.

There are several techniques that are used in recognizing individuals from the images captured by sensors 302 and or 303 facial recognition, side recognition, body shape matching and gait recognition. These techniques require different levels of complexity from the software stored in the program memory 103B and put different strain on the CPU 101.

In case of facial or side recognition, a single captured image is used to find and recognize the faces in it. As such, the captured image is usually first processed with a facial detection algorithm to identify all the faces in the image and then with facial recognition algorithms to identify who these faces belong to. Side recognition works the same way with the difference being that for the facial recognition, a subject is directly facing the camera such that both of his or her eyes can be visible by the camera and in the case of side recognition, the face is turned further away from the camera and as such, usually, at most one eye is visible by the camera.

Body shape matching relies on various measurements of different body parts, as seen by the camera. Specific ratios of different body parts' length, width or height is measured and compared against another body part of the same individual. This ratio uniquely identifies people and can be used to recognize them. For example, the head width in relation to shoulder width can be used, as well as overall body height in relation to the leg length is used, etc. There are many different aspect rations that are calculated and it should be obvious to those skilled in the art that no particular ratio should be excluded from the scope of this disclosure even if not explicitly enumerated.

In some cases, the body shape recognition requires the knowledge of the distance to the person from the imaging camera, so in these cases a 3-D sensing technique or another way to measure the distance to the person being recognized needs to be used. Examples of such measurements are height of a person, their estimated body circumference, their estimated girth, estimated weight, estimated shoulder width, etc.

While gait detection is the only one of the aforementioned techniques requiring a sequence of images rather than a single image, the reliability of all these techniques is greatly enhanced when the same algorithms are applied to a known sequence of images instead of just single image. In other words, the algorithms used are deployed on a number of images, were each image can be processed individually to further increase the odds of correct recognition, even if the recognition attempts on one or a few images yield a false recognition. A complete set of such images is referred to as a single epoch. There can be a number of images taken in an epoch ranging from one to thousands. The most preferred number is in the range of 1 to 200.

Figure 6:
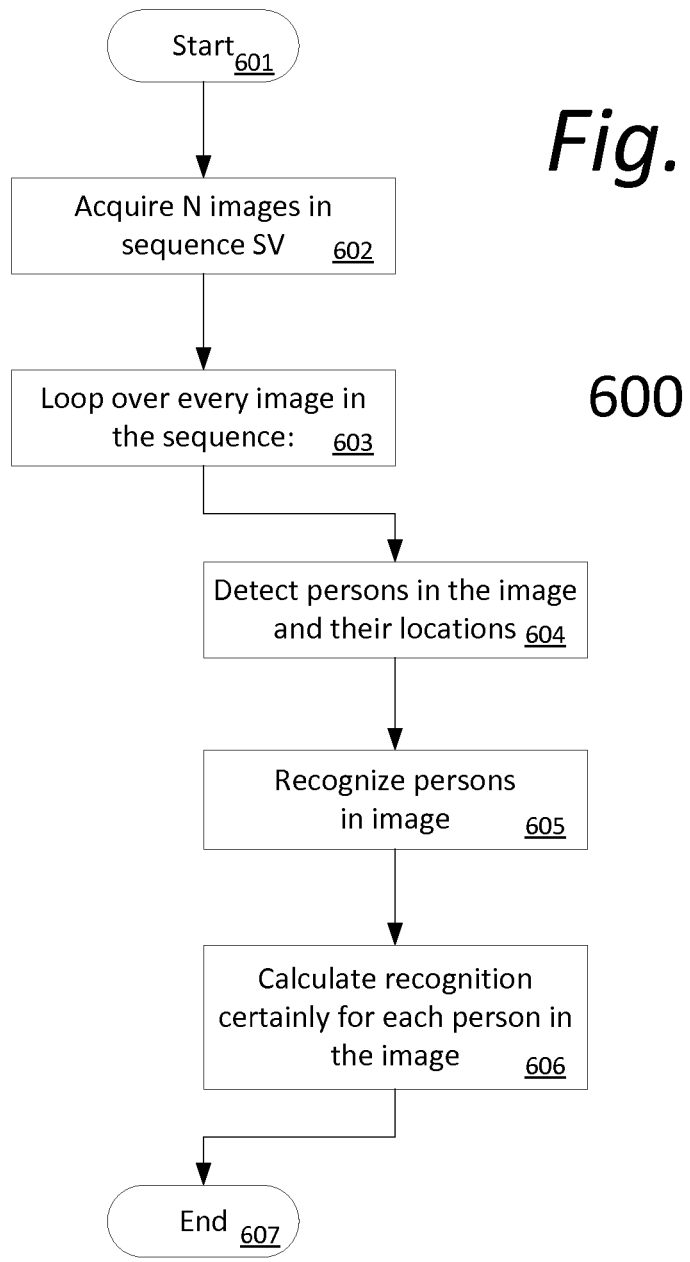
FIG. 6 introduces a flowchart of a method to recognize persons from images in a occupancy-aware network hub.

The general outline of the method 600 used to analyze images is shown in FIG. 6. The method starts at locus 601 and continues to acquire a set of N images in a sequence SV (called an epoch) in step 602. In the following step 603, the method loops over the N collected images to first detect all persons in the image in step 604, then recognize the detected persons in step 605 and finally to calculate the certainty coefficients in step 606. The certainty coefficient is a number from 0 to 1, inclusive, that represents how certain the method is that a proper person was detected and recognized. The value of 0 indicates no certainty and the value of 1 indicates total absolute certainty that a correct person was recognized. In practice, the values are in between 0 and 1 representing an increasing probability that a correct recognition was made. The method ends when all N iterations have completed in step 607.

The presented method applies to frontal facial recognition, side face recognition and body shape recognition techniques. For gait recognition the steps 604 through 606 are replaced with one general algorithm step that results in a single recognition for the sequence, rather than one per image acquired.

Another technique used in recognizing individuals is based on the sounds captured by the microphones 305. The algorithm calculates the distance to the sound source based on the delay (e.g. phase difference) of sound between different microphones. When a person starts to talk, the sound of his voice arrives at the microphones at different times, depending on the physical distance of the person from the microphones. Only a person standing ideally in front of the microphone pair, with the same exact distance to both microphones produces no delay with the sound of his voice.

Figure 7:
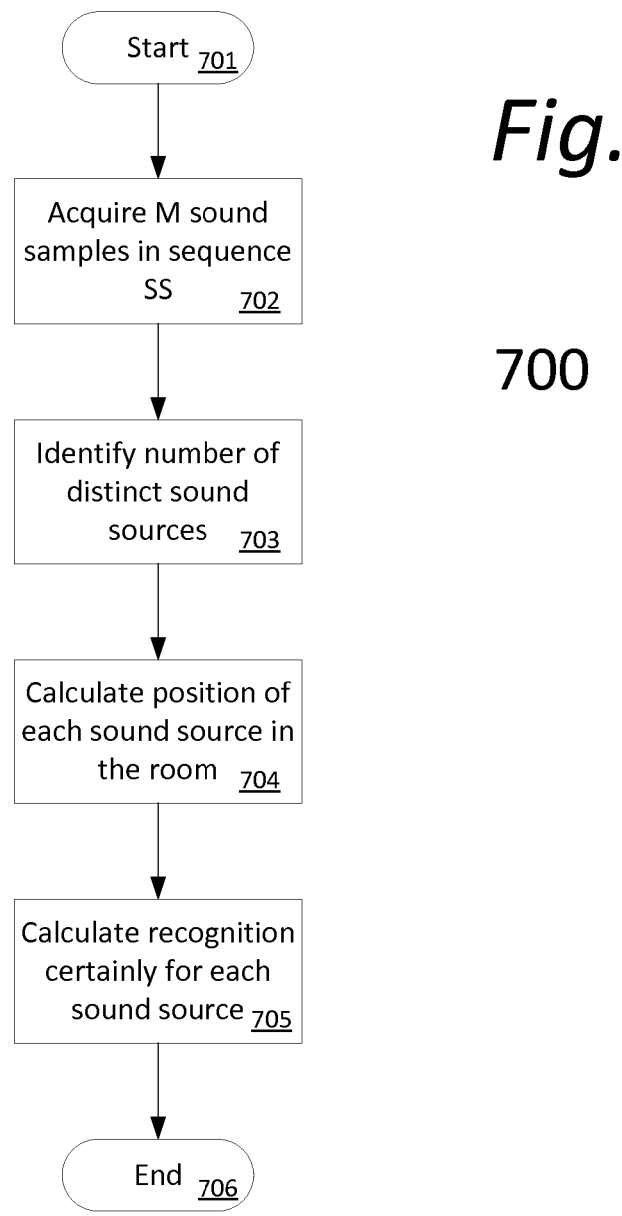
FIG. 7 presents a flowchart of a method to recognize and locate a sound source in a room relative to the position of the occupancy-aware network hub.

The FIG. 7 shows a method 700 of recognizing the persons based on received voice samples. The method starts at step 701 and proceeds to acquire M sound samples from multiple sensors in a sequence SS. It is preferred that the data acquired in the step 702 is equivalent to an epoch. The method then proceeds to analyze collected samples and identify all distinct sound sources in step 703, as well as calculate position of each sound source in the room in step 704. Note that in some embodiments steps 703 and 704 happen virtually at the same time, yet in another set of embodiments, the order of these two steps can be reversed, but they both are completed before the method moves on to step 705 where a recognition certainty for each detected source is calculated. The method commences in step 706.

The data from the microphones 305 is processed by the CPU 101 or an optional auxiliary CPU (not shown) and the results showing the angle of the person relative to the middle of the sensor are used by the CPU to correlate the sounds with the faces detected in the same location by the imaging sensor. It is a feature of the disclosed invention that the microphones are positioned in a special way relative to the imaging sensor assembly that a correlation between the origin of the sound and the data retrieved from the imagining sensor can be readily made. This correlation is then used to aggregate data from the imagining sensors and the microphones to further increase the confidence coefficient for person recognition based on the sounds they make and the image or image set acquired at the same time.

The following formula is used to calculate an estimate of who is in the room at any given time:

$$f(P, t) = \sum_{f=1}^{MeasureCount} \sum_{j=o}^{Maxtime} (K_{ij} \cdot \text{Conf\_coeff}_i(P)(t-j))$$

The MeasureCount is the number of different types of measurements that produce a confidence coefficient Conf_coeff$_i$(P)(t−j) that a person P was detected by measurement type i at the time sample j before the present time. MaxTime is the number of previous epochs (sample sets) taken into consideration to determine that a person P is still in the room. The scaling coefficients $K_{ij}$ consider the quality of prediction of one particular type of measurement and its (usually) non-increasing impact over time. The types of measurement include voice recognition, face recognition, side recognition, body shape recognition, gait detection, etc. Finally, the calculated value of the function f(P,t) is a number representing the probability that a person P is in the room at the time t.

These image and sound based measurements can be further expanded by recognition based on detecting cellular devices in the room, smart watches and personal health trackers, among other things. This detection is done using the devices long range and short range communications circuits, 106 and 108, respectively. In general any device that can be worn by a person and which produces a signature that can be identified by any of the disclosed device's electronic circuits, can be detected and included in the recognition analysis.

The outcome of the formula needs to be calculated for all potentially detected persons P in the room. For example, if all detection algorithms result in at least one algorithm recognizing a person within the most recent MaxTime number of epochs, the formula f(P,t) is calculated for that person.

In the last step, the formula f(P,t) is compared against two threshold values to determine that a person P is really in the room at the time t, or that an unknown person is in the room, or that there is insufficient data to determine that any person is in the room, as explained below.

The above formula may be then further aggregated to account for changes in the occupancy of the room over time. When it is determined that there are no people in the room, the sensor can be optionally put into a sleep mode to conserve energy. The sensor may be woken up from the sleep mode either when a PIR sensor activation is detected, or a sound is heard of sufficient volume and duration, or when a noticeable change in the image received by one of the imaging sensors is detected.

The described method can be generalized in a method 800 shown in FIG. 8. The method starts at step 801 and proceeds to step 802 where all available data from different sensors is collected. Then, in the step 803, the data is further refined by correlating readings of different sensors. This refinement may result in changes in confidence level prediction for all or some of the measurements and as a result may even change the outcome of the recognition. The method then proceeds to step 804 where the final certainty levels for all detected persons are calculated using the above mentioned formula and in the ensuing step 805 these certainty levels are subjected to further analysis that determines who is in the room at the current time (defined as time where then the most recent samples were taken). The determination performed in step 805 can be a matter of applying a simple two threshold value test—if the formula f(P,t) returns a value below the first, lower threshold, the detection of person P is marked as a false positive. When the calculated value exceeds the first threshold, but falls below the second threshold, the person P is classified as a new person, previously unknown to the system. When the formula returns the value that exceeds both thresholds, the detected person P is determined to be present in the room. The method concludes in step 806.

It should be obvious to those skilled in the art, that the method 800 is not the final action performed by the system. From this point on the system acts in a matter it is preprogrammed to. For example, a number of system-level actions can be triggered, such as acquisition of the new person image and voice samples to build a model for a new building occupant. Application-level actions can be triggered as well, such as notifying the system owner, system supervisor or network administrator that an unknown person is detected, automatically sounding an alarm, prompting the person to identify himself, etc.

Another aspect of the presented invention is to eliminate the sources of erroneous data such as images on the wall, on TV, sounds played from the TV, radio, music boxes and any other sources of sounds. This is accomplished by identifying the location of the video or audio signal over an extended period of time. If the location is practically constant over an extended period of time, and produces a unique video, infrared or sound signature, it can be classified as a Radio or Television (RIV) type transmitter and consequently eliminated from the recognition pool.

One particular category of devices that is paid special attention to are reflective surfaces, such as mirrors or highly reflective walls. These are identified by running a long term detection and comparing the resulting location. If it is constant, produces varying images, but produces no sound of its own, it is classified as a mirror surface. Mirror surfaces can be excluded from the scene analysis, or included in it, depending on the version of the algorithm used. Since mirrors produce a reflective image, that image needs to be processed differently from a non reflected image, so the decision whether to use the images from mirrors is usually driven by the estimate of computational capacity in the system. For devices where the CPU 101 includes both a conventional CPU and FPGA or high-end DSP such added complexity can be handled. For system with a more limited CPU, they are excluded.

Another potential way to identify the video source or the mirror surface is measuring its temperature with the optional IR imaging sensor.

It should be readily apparent to those skilled in the art that the quality of the device and network performance is a factor of the computational capacity of the CPU 101. While the technological progress guarantees ever increasing performance of new CPUs on the market, the nature of the calculations can be complex enough for even the most capable CPUs on the market today, especially when considering the cost trade-off of manufacturing the disclosed device and network of such devices. It is thus another feature of the presented invention to help optimize the performance of the used algorithms. Two of the most computationally expensive components of the disclosed algorithms are face or body shape detection and recognition. The presented device makes use of additional algorithms to minimize the false positive detection of faces and shapes that are not really human faces or human bodies, and thus falsely recognizing them later, leading to confusion and decreased system reliability.

One of the algorithms used tracks the movement of the persons in the room to determine if they are moving towards or away from the sensor. If the person is determined to be moving towards the sensor, for example by their size increasing from one frame to another, later frame, the algorithm uses the later picture or series of pictures to detect and recognize the person's face and or body shape. The whole sequence of frames is used for gait detection. Similarly, the side face detection algorithm is triggered, when it is determined that a person is moving sideways in relation to the sensor. The body shape detection algorithm variants can also be used when the person is moving sideways. Similarly, there exist variants of the gait detection algorithms that use side view of the person to identify them. Any and all of these algorithms may be used in the disclosed invention. These algorithms can be further improved with the presence of the optional IR imaging sensor that detects the specific temperature of the persons face or other body parts.

One more feature of the presented invention is the ability of the network of hubs to self-diagnose any issues with a particular occupancy-aware hub. The self-diagnostic relies on comparing the readings from the adjacent network hubs with that of its own and measuring its deviation from the readings of other sensors. This specifically applies to the temperature sensors, humidity sensors, microphones and optional IR imaging sensors. If the deviation continuously increases over an extended, predefined duration of time, the sensor is flagged as potentially malfunctioning and the system supervisor or the network administrator is notified by the network occupancy controller 460.

Those skilled in the art to which this application relates will appreciate that other and further additions, deletions, substitutions and modifications may be made to the described embodiments.

What is claimed is:

1. A smart device application for a smart device having sensors, the smart device application comprising:
   an executable program configured to execute on a central processing unit having a processor and memory, the memory including processor-executable instructions accessible to the processor;
   the executable program having a setup mode, the setup mode including processor-executable instructions to make use of the sensors to generate data, the data being representative of a continuously drawn outline of building rooms as the smart device moves around the building; and
   the executable program having a communication mode, the communication mode including processor-executable instructions to share the data collected by the smart device application with an occupancy sensor equipped device.

2. The smart device application as recited in claim 1, wherein the communication mode further comprises processor-executable instructions to communicate with a network hub in a room wherein the smart device is located.

3. The smart device application as recited in claim 2, wherein the data received from the network hub is used to identify the room where the smart device is located.

4. The smart device application as recited in claim 2, wherein the data received from the network hub is used to identify the room where the smart device is located in real-time.

5. The smart device application as recited in claim 1, wherein the setup mode further comprises processor-executable instructions to emit identifying sounds as the device is moved around the building.

6. The smart device application as recited in claim 1, wherein the setup mode further comprises process-executable instructions to measure Relative Signal Strength Indicator (RSSI) of messages received from other network communication devices.

7. The smart device application as recited in claim 6, wherein the setup mode further comprises process-executable instructions to use the measured RSSI values to detect current location of the smart device within the building.

8. A smart device comprising:
   a central processing unit having a processor and memory, the memory including processor-executable instructions accessible to the processor;
   a plurality of sensors communicating with the central processing unit;
   an executable program configured to execute on the central processing unit;
   the executable program having a setup mode, the setup mode including processor-executable instructions to make use of the plurality of sensors to generate data, the data being representative of a continuously drawn three-dimensional outline of building rooms as the smart device moves around the building; and
   the executable program having a communication mode, the communication mode including processor-executable instructions to share the data collected by the smart device application with an occupancy sensor equipped device.

9. The smart device as recited in claim 8, wherein the communication mode further comprises processor-executable instructions to communicate with a network hub in a room wherein the smart device is located.

10. The smart device as recited in claim 8, wherein the data received from the network hub is used to identify the room where the smart device is located in real-time.

11. The smart device as recited in claim 8, wherein the setup mode further comprises processor-executable instructions to emit identifying sounds as the device is moved around the building.

12. The smart device as recited in claim 8, wherein the setup mode further comprises process-executable instructions to measure Relative Signal Strength Indicator (RSSI) of messages received from other network communication devices.

13. A method for configuring an occupancy sensor equipped device located in a room comprising:
   using a smart device having a sensor to collect data about the room, the data being representative of a continuously drawn three-dimensional outline of the room;
   loading the data to the occupancy sensor equipped device; and
   generating at the occupancy sensor equipped device a three-dimensional representation of the room for use by the occupancy sensor equipped device.

14. The method for configuring an occupancy sensor equipped device as recited in claim 13, wherein the occupancy sensor equipped device further comprises the smart device.

15. The method for configuring an occupancy sensor equipped device as recited in claim 13, wherein generating the three-dimensional representation of the room further comprises utilizing the smart device to generate the three dimensional representation of the room.

16. The method for configuring an occupancy sensor equipped device as recited in claim 13, wherein loading the data to the occupancy sensor equipped device further comprises:
   uploading the data to a remote server; and
   at least partially generating the three-dimensional representation of the room at the remote server.

17. The method for configuring an occupancy sensor equipped device as recited in claim 13, wherein loading the data to the occupancy sensor equipped device further comprises:
   uploading the data to a remote server;
   at least partially generating the three-dimensional representation of the room at the remote server; and
   communicating the at least partially generated three-dimensional representation of the room from the remote server to the occupancy sensor equipped device.

18. The method for configuring an occupancy sensor equipped device as recited in claim 13, further comprising indicating the location in the room of the occupancy sensor equipped device on the smart device collecting the data.

19. The method for configuring an occupancy sensor equipped device as recited in claim 13, further comprising indicating the location in the room of the occupancy sensor equipped device on a remote server.

20. The method for configuring an occupancy sensor equipped device as recited in claim 13, further comprising calculating by the occupancy sensor equipped device location of the occupancy sensor equipped device in the room.

* * * * *